United States Patent [19]

Sterner et al.

[11] Patent Number: 4,735,816
[45] Date of Patent: Apr. 5, 1988

[54] DEHYDRATED REFRIED BEAN PRODUCT AND METHODS OF MANUFACTURE

[76] Inventors: Mark H. Sterner, 5553 Wentworth, Riverside, Calif. 92505; Mark M. Sterner, 1772 Melqua Rd., Roseburg, Calif. 97470; Ronald S. O. Zane, 5553 Wentworth, Riverside, Calif. 92505

[21] Appl. No.: 935,265

[22] Filed: Nov. 26, 1986

Related U.S. Application Data

[63] Continuation-in-part of Ser. No. 775,756, Sep. 13, 1985, abandoned.

[51] Int. Cl.$^4$ .......................... A23B 7/02; A23L 1/20
[52] U.S. Cl. .................................. 426/457; 426/461; 426/507; 426/510; 426/634
[58] Field of Search .............. 426/457, 460, 461, 634, 426/507, 629, 510

[56] References Cited

U.S. PATENT DOCUMENTS

| | | | |
|---|---|---|---|
| 1,088,741 | 3/1914 | Stephens | 426/634 |
| 1,813,268 | 7/1931 | Bachler | 426/634 |
| 4,407,840 | 10/1983 | Lathrop et al. | 426/629 |

Primary Examiner—George Yeung
Attorney, Agent, or Firm—Stetina and Brunda

[57] ABSTRACT

Processes for producing a dried leguminosae to form an instantly reconstitutable product having the appearance texture and consistency of conventionally prepared commestibles are disclosed. In the production of these commestibles, the leguminosae are cooked in a manner to maintain the skin generally intact and subsequently non-comminutively pressed to minimize grittiness and graininess of the resultant product. The pressed product is of sufficient thickness to facilitate rapid dehydration and rapid reconstitution to provide a resultant reconstituted product which assimilates the organoleptic characteristics of conventionally prepared non-dehydrated product.

24 Claims, 1 Drawing Sheet

DEHYDRATED REFRIED BEAN PRODUCT AND METHODS OF MANUFACTURE

RELATED INVENTIONS

The subject application is a continuation-in-part patent application of Ser. No. 775,756 filed on Sept. 13, 1985 entitled Dehydrated Refried Bean Product and Method of Manufacture, now abandoned.

BACKGROUND OF INVENTION

This invention relates generally to the production of a rapidly or instantly reconstitutable leguminous comestibles and more particularly to improved methods of manufacturing a dehydrated bean product so that the reconstitutable product formed by the process is more simulative in terms of texture and color to the actual non-reconstituted product.

In the field of food preparation services and more specifically Mexican restaurants and/or Mexican fast food restaurant services, the use of refried beans is widespread. However, conventional cooking methods for preparing refried beans generally consume a long period of time, on the order of a few hours, and require a high level of culinary skill in order to consistently produce delectable refried bean products. Because of such lengthy preparation time, consumers typically are reluctant to prepare such products for family consumption while fast food services and restaurants are unable to quickly respond to the highly fluctuating consumer demands of the food industry. Furthermore, because of the wide variation in the culinary skills of the food industry worker, it is difficult to guarantee or maintain the same level of consistency in the cooked product. Although the use of canned refried beans products has proven useful for residential family applications, the use of such canned products in the food service trade has not been wide spread due primarily to the high shipping and warehousing costs associated with canned products as well as the difficulty in opening and disposing of the canned containers. Therefore, there is a distinct need for instant or reconstitutionable leguminosae food product such that a high level of culinary skill is not required to prepare the product and the product conforms more quickly to the demand that the restaurant has at the particular instant of time.

Despite recent gains in the art of producing quickly reconstitutible food products, there still remain inadequacies in the presently available methods for producing such products. Foremost of these deficiencies is the inability to produce a reconstitutable food product which closely assimilates the color, taste and texture, i.e. organoleptic characteristics, of the actual non-reconstituted product. In addition, the prior art processes for preparing reconstituted products have generally proven costly thereby preventing the widespread commercial use in the home as well as industry.

Presently available instantizing processes (i.e. processes for producing a reconstitutable bean product) can be broadly segregated into one of two methods or a combination of both. One method is to mill the beans or food products down to a small size. Common milling practices in the art generally include a micropulverizer or a pinmill. The prior art methods mash the leguminosae or bean product through a finely sized screen mesh by rotating hammers and incorporate a blower which aids the passage of the comminutive food product through said screens. These screens range from a number 70 sieve/number 80 sieve to one-quarter of an inch between the screen wire mesh sizes. As a result, the food product is substantially reduced in size to decrease drying and reconstitution time. However, there are inherent deficiencies in this method.

One such deficiency is that the resultant product does not have the asthetic characteristics of conventionally prepared refried beans. The food products so processed do not replicate the texture of conventionally prepared refried beans because of an inherent grittyness or graininess in the resultant end product. This objectionable texture is believed to be the result of the food fibers or insoluable protein pieces being cut during the comminutive processing, leaving sharp edges in the food particles which are not found in conventionally prepared refried bean products. Prior art attempts to better simulate conventionally prepared bean products to date have been directed toward milling the larger particles separately and remixing the same with the finer mesh dried product in an amount of about fifteen percent in order to try and achieve a more realistic eatable type feeling. Another problem with this type of prior art process is the fact that a considerable amount of energy is used by the grinding process which invariably increase the overall cost of production of the product.

Furthermore, because of the high frictional heat involved in the milling or grinding process, the food product moisture level of three to seven percent moisture by weight of the food product results. A moisture level of seven to ten percent is desired to effect production economies. However, it has been found to be economically unfeasible to re-add the three to four percent moisture by weight to the milled product. Thus, this prior art method of producing reconstitutable leguminosae does not resolve prior art processing deficiencies.

The other general prior art method utilized to produce such reconstituted products is to explode or rupture the beans by rapid pressure changes in the cooking environment. In this second prior art method, the leguminosae are initially cooked under high pressure and temperature within a pressure cooker. The food product, upon completion of the cooking process, is discharged into a container at ambient temperature and pressure in a manner providing almost instantaneous pressure release. By this method, the moisture contained in the bean product instantly turns to steam upon release and rapidly expands. As a result, the leguminosae expands and ruptures in a manner similar to that which occurs in popcorn kernels, whereby the individual beans and bean pieces are ruptured with interstices formed within the leguminosae, resulting in a decreased reconstitution cooking time and a decreased product size to facilitate in the drying process. However, by this prior art method the larger bean pieces still require an inordinate drying time which therefore additionally requires a milling of the larger bean pieces. Thus this prior art method is still subject to the deficiencies of the earlier mentioned milling process. Furthermore, by this explosive procedure, there is still an amount of fiber and insoluable protein resulting in objectionably detectable grittiness and graininess. Thus, this second prior art method generally does not transverse the previous asthetic and organoleptic deficiencies found in the prior art. Examples of such prior art methods are disclosed in U.S. Pat. No. 1,088,741 issued to Stephens; U.S. Pat. No. 2,343,149 issued to Krause Jr.; U.S. Pat. No.

2,657,999 issued to Rauch; U.S. Pat. No. 4,251,558 issued to Kobayashi; and U.S. Pat. No. 4,407,840 issued to Lathrop.

As such, there is a substantial need in the art to provide reconstitutable leguminosae product which possesses decreased cooking or reconstitution time, can be more economically produced, and when reconstituted, closely simulates the texture and appearance and organoleptic characteristics of conventionally prepared leguminosae food products.

SUMMARY OF INVENTION

The present invention comprises improved processes which are very significant advances in the field of food processing since they concurrently decrease the amount of cooking time required to prepare and reconstitute the leguminous product and also decrease the amount of graininess or grittiness in the resulting product. More particularly, in a first embodiment, the present invention discloses a means to avoid the deficiencies in the prior art by a process which comprises pressure cooking the leguminosae, i.e. preferably beans, wherein the pressure is released slowly and the particular pressure used is not generally excessive, i.e. typically between 0.5 to 25 psi and preferably 10–15 pounds per square inch (psi). Subsequent to cooking, any excess free water is drained off the beans and any outside moisture is removed. In contrast to the conventional prior art methods, in the method of the first embodiment of the present invention, the resultant beans are rolled or crushed and thus, not ground or finely comminuted. The beans are thus rolled or pressed to a sufficient thiness having a cross-section thickness ranging between 0.005–0.200 inches and preferably between 0.010 and 0.050 inches which has been found to eliminate any resulting grittiness or graininess in the final reconstituted product. Furthermore, an additional advantage is achieved by this particular method in that drying is facilitated with a decreased amount of energy expanded and thus the objectives of the earlier means or methods of reconstitutable refried beans is achieved without a loss of the asthetic qualities as earlier stated. After the beans are pressed, they are dried by various means, generally on a hot air belt-drier.

As a result of this first embodiment process, the final end product upon being reconstituted with water has an appearance and texture substantially identical to the best traditional or conventionally prepared refried beans in that they have a texture or typical mouth feel with no grittiness or graininess as a result. Furthermore, because there is no moisture lost during a milling process, the moisture level is retained at approximately seven to ten percent. Furthermore, there is a higher yield as a result of a lack of grinding process since there is a seven to ten percent moisture level as opposed to a three to seven percent moisture level as previously described. As a result, taste and texture are generally favorable with regards to comparisons to traditionally prepared bean products.

In the second embodiment of the present invention, the raw bean products are typically split in half or quartered in a cracking roller or a slowly rotating hammer-mill fitted with a slotted screen. The split beans are subsequently placed in a rotatable pressure vessel to which a suitable quantity of water (i.e. approximately sixty three percent by weight of water to weight of raw beans) is added to the vessel. Subsequently, steam is introduced into the lower region of the rotatable vessel while venting air from the vessel at its upper end therof. After the air is purged from the interior of the vessel by the impinging steam, venting of the vessel is discontinued and the steam pressure within the vessel is raised to approximately 30 psi absolute (i.e. 15 psi gauge) to cook the beans within the vessel. Although the amount of steam introduced into the vessel may vary, preferably an amount of approximately twenty percent by weight of condensate absorbed from the steam is added to the vessel. While the pressure is maintained within the vessel, the vessel is periodically rotated about its horizontal axis.

After a sufficient cooking time within the vessel, the vessel is rotated to an inverted upside down position and the steam pressure within the vessel is slowly vented to atmosphere. The cooked beans are subsequently discharged from the vessel and conveyed to a heated roller mill where they are pressed or squeeze to a thickness ranging from 0.005 inches to 0.200 inches. The pressed beans are then dried using conventional techniques to form a dehydrated refired bean product. As with the first embodiment of the present invention, due to its pressing step, the second embodiment does not finally comminute the beans during the preparation process, which has been found by the applicants to provide a final end bean product which upon being reconstituted with water possesses the organoleptic characteristics of conventionally prepared refried bean products and further, may be prepared at substantial cost efficiencies.

DESCRIPTION OF THE DRAWINGS

These as well as other features of the present invention will become more apparent from the detailed description of the present invention and reference to the drawings wherein.

DETAILED DESCRIPTION OF PREFERRED EMBODIMENT

Broadly speaking, the present invention is comprised generally of the steps of cooking a quantity of beans; partially drying the beans so as not to totally dehydrate the same; non-comminutely pressing the beans into flakes; and subsequently rapidly dehydrating the pressed bean flakes. Although both preferred embodiments of the present invention the method is directed toward the production of a reconstituted refried bean product, the method is additionally suitable for use with all leguminosae such as pinto beans, garbonzo beans and peas as well as certain grains such as corn, wheat, rice, barley, triticale, oats, buckwheat and for purposes of this application, the terms refried beans, beans and leguminosae shall be defined to include the same.

Figure 1:
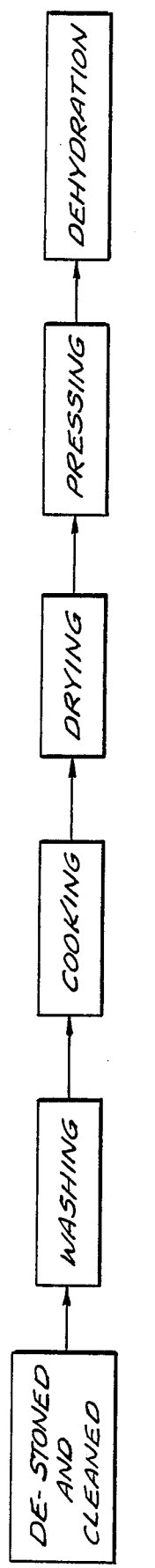
FIG. 1 is a schematic illustration of the first embodiment of the process of the present invention for preparing dehydrated leguminous product.

Referring more particularly to FIG. 1, the first embodiment of the present invention is depicted. Initially the beans are cleaned, de-stoned and the unsound beans are removed from use. Following such initial screening and preparation, the beans are washed to remove any pesticides, dirt or other unpalatable elements from the beans themselves. The beans may then be cooked by either a conventional method of pressure vessel method. In the conventional cooking method the whole clean beans are soaked in a 2:1 proportion or ratio of water to beans for about a four to six hour period. The soaking water is then drained and discarded. The resulting soaked beans are then covered with fresh water and following this a two to four percent by weight of dried beans amount of common salt (sodium chloride) is added to the fresh water solution. The resultant mixture of fresh water, common table salt and beans is subsequently boiled until the beans are soft and palatable. The soaking of the beans is generally done since the leguminosae are generally of a dried bean variety and thus soaking eases or reduces the natural wax coating and also allows or increases the permeability of outer skin of the leguminosae and thus aids in the particular cooking of the beans.

The pressure vessel method which can be used to cook the beans comprises placing the beans into a pressure vessel and introducing steam therein. By placing or cooking the beans in a conventional pressure cooking vessel, the steam is retained and thus the water soluable flavors that may be lost in a normal conventional cooking will be retained within the vessel. By this method water equal to 2.5-3.0 times the dry weight of the original beans is added to the amount of beans and placed in the pressure cooker. Common table salt equal to approximately two percent to four percent of the original dry weight of the beans may also be added to the mixture. The mixture is then brought to a boil, the vent of the pressure cooker is closed and the pressure is raised to approximately 0.5 to 25 pounds per square inch, preferably 10-15 pounds per square inch (psi). The pressure is maintained for 5-60 minutes, preferably 15-20 minutes depending on the particular species of leguminosae used, in that dryer or tougher beans may require a longer cooking time. After a time sufficient to render the beans soft and palatable, the pressure is released slowly so as not to enable the beans to explode and the vessel is opened. By releasing the pressure slowly, the the beans are substantially maintained intact which avoids any exploding of the same. As a result, the jagged edges, cut fiber and insoluable protein grittiness or graininess normally found in the prior art product is reduced.

The next manipulative step of the first embodiment of the present invention involves the drying of the cooked leguminosae before application of the pressing and dehydrating steps of the process. Preferably, this drying is not sufficient to totally dehydrate the cooked beans, but rather comprises the initial draining of the excess water from the beans and the partial drying of the beans to remove the free moisture from the outer skin of the same. More particularly, the draining of the excess water is generally accomplished by placing the cooked beans on a shaker apparatus whereby the beans are shaken on a screen to allow the majority of water maintained on the outer skin of the beans to be removed without deliberately repturing or affecting the moisture retained inside the beans. In some instances, a second sub-step of this drying procedure may be utilized. This second sub-step may involve the blast drying of the beans at ambient or moderately elevated temperature to remove the remaining free moisture from their outside surfaces or may comprise merely exposing the beans to ambient air. Further, this can be accomplished either by subjecting the beans to a blast of air or by moderately heating the beans to evaporate the remaining water. Either process results in a tempering of the beans which dries the moisture on the outside of the beans and directs the same into the interior of the bean.

Following the cooking and drying steps, a non-comminutive pressing process is applied to the beans so that there is no graininess or grittiness resulting from the cut fiber or insoluable proteins. This processing involves a rolling or pressing of the cooked beans into a thin configuration. This may be simply accomplished by a rolling pin type apparatus, or as in the preferred embodiment, by a set of rollers connected to a continuous belt. As a result of the rolling step, the thickness of the beans are reduced to approximately 0.005 to 0.200 inches and preferably between 0.010 and 0.050 inches. This thickness is sufficiently thin to allow for a quick or rapid drying time but mainly is utilized to increase the speed of reconstitutability of the resulting instant product and more closely simulate the organoleptic characteristics of conventionally prepared beans. Furthermore, by this pressing step, the fiber, the outer skin and insoluable protein structures are maintained substantially intact, which results in an avoidance of the prior art deficiencies of grittiness and graininess resulting from said structures being cut as in the prior art embodiments. Furthermore, by this process a sufficiently high proportion of particulate bean matter is still retained within the overall mixture. This precludes or does not require therefore the additional method utilized in the prior art of adding back fifteen percent of higher or larger type particles in order to more easily simulate a refried bean product made under conventional processes. Because the particular bean product is not milled or pulverized, the problems of increased energy usage, asthetic qualities, and lower moisture loss during the grinding process are avoided and thus the deficiencies of the prior art as earlier stated are therefore transversed by the present process.

Subsequently, the pressed beans are subjected to a dehydration process. Generally this dehydration process comprises heating the beans on pans or screens in an oven maintained at a temperature of approximately 140 degrees to 300 degrees farenheit. This exposure is maintained until the moisture decreases to about six to twelve percent by weight of the original dry weight of the beans. Fans are usually used to circulate air within the ovens and the moisture that is given off by the beans is vented to the environment from the oven and thus the beans product is dehydrated.

Alternatively, the dehydration process may involve exposing the beans to a continuous dryer with hot air generally between 130 degrees to 300 degrees Farenheit circulating through the beans until the moisture is reduced to about seven to ten percent. In the presently preferred embodiment, the bean flakes are placed on a continuous belt dryer such that hot air is driven through the flakes at about 130 to 200 degrees. The beans are thereby dried to approximately seven to ten percent moisture by weight of the original dryed beans and, thus, result in a higher yield from the beans processed. This higher percentage by weight of moisture is a result of the avoidance of a comminutive size reducing process so that the particular beans are not ground by typical hammer mills and thus moisture which is generally lost during said grinding is not lost in the present embodiment.

Finally, seasonings, anti-oxidants or preservatives may be added to the particular dehydrated bean mixture so as to result in a more palatable refried bean product. This adding of flavors or anti-oxidants may be at any convenient stage although it is preferably done to the hot bean flakes formed upon discharge of the beans from the roller or non-comminutive pressing process. According to a preferred embodiment, animal or vegetable fat or oil, in the amount of from about two percent to twelve percent by weight and seasoning in an amount from about 0.5-2 percent by weight are added with mixing, to the bean mixture before application of the dehydration process. Alternatively, the fat and oil may be introduced with the beans and water into the pressure cooker or dry blended into the product after it has been dehydrated.

Finally, the particular resulting product of said process is usually placed in packages which are hermetically sealed to preserve the food product and also to prevent an exposure of the resultant product to moisture in the air.

The resultant dried bean product of this invention which has a maximum moisture content of about seven to ten percent is rapidly reconstitutable with hot water. In the prefered embodiment, the product is mixed with water in the ratio of less than 3.5 parts by weight of water per part by weight of product and stirred slightly upon reconstitution. As such, the resulting reconstituted product is rapidly or instantly reconstituted and has asthetic qualities similar to conventionally prepared refried beans and is substantially the same as that of commercially available canned refried beans with a reconstituted product retaining substantially all its moisture upon being held in a steam tray.

Figure 2:
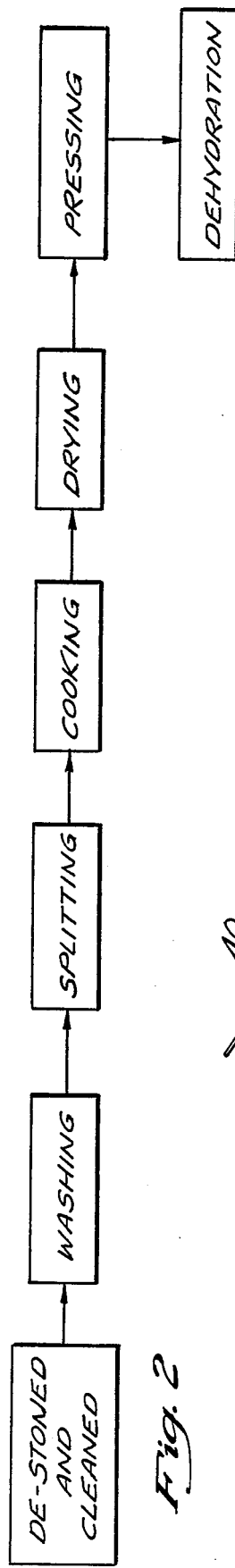
FIG. 2 is a schematic illustration of the second embodiment of the process of the present invention for preparing dehydrated leguminous product.

Referring to FIG. 2, the second embodiment of the method of the present invention is depicted, which as with the first embodiment, comprises a non-comminutive process to facilitate to the rapid absorption of water during reconstitution and more closely approximate the organoleptic characteristics of conventionally prepared refried bean products. As in the first embodiment, the second embodiment contemplates the destoning, cleaning and washing of the raw bean products in a manner previously described. However, as opposed to the first embodiment, the second embodiment additionally comprises the step of splitting the beans typically in half or more or less in quarters in a cracking roller or slowly rotating hammermill fitted with an appropriate size slotted screen. When using a hammermill, the slots of the screen are such that a whole bean will not quite pass therethrough, while a half bean or cotyledon will freely pass through. It is important to note that the reduction in bean size caused by the splitting procedure optimizes the efficiency of the overall process by enabling a substantial reduction in the subsequent cooking time required to thoroughly cook the beans. It is additionally important to note that in the splitting procedure, the beans are not finely comminutated but rather, are merely split or quartered whereby the process is able to avoid the prior art problems of rough mouth feel experience when the bean fiber and non-soluble portions of the bean are finely comminutated.

Figure 3:
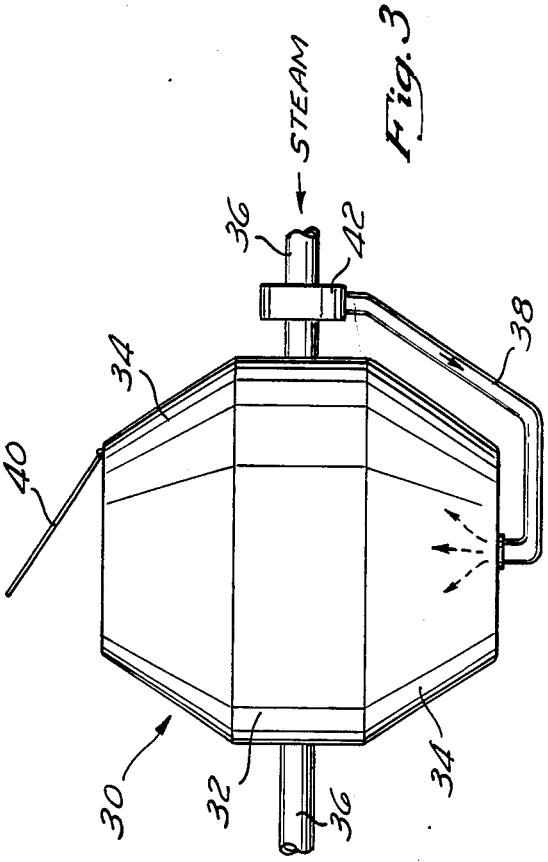
FIG. 3 is a schematic representation of the rotatable pressure vessel used in the second embodiment of the present invention.

After splitting, the beans are placed in a rotatable pressure vessel which is specifically designed for achieving a rapid and complete cooking of the split beans. Referring to FIG. 3, the rotatable pressure vessel 30 is schematically depicted. The vessel 30 is preferably fabricated having a cylindrical center portion 32 and a pair of truncated cone shaped, i.e. frustro conical end portions 34 rigidly attached thereto as by way of welding. In the preferred embodiment, the central portion 32 comprises approximately one-third of the overall height of the vessel, with the other truncated or frustro conical shaped end portions each comprising an additional one-third of the overall height of the vessel. The vessel 30 is mounted upon a central horizontal axis 36 which permits rotation of the vessel 30 about the horizontal axis. The lower frustro conical shaped end portion 34 is provided with means 38 for introducing live steam and water into the interior of the vessel 30 while the upper frustro conical shaped end portion 34 is provided with a pressure tight quickly removable lid 40 through which the beans may be introduced and discharged from the interior of the vessel 30 as well as permit the venting of the interior of the vessel 30 at desired instances. In the preferred embodiment, the axle 36 is formed in a hollow shaft configuration and is fitted with a conventional rotary steam union 42 to permit transport of steam through the steam introduction means 38 during rotation of the vessel 30 about the horizontal axis.

Referring concurrently to FIGS. 2 and 3, the cooking step of the present invention comprises the introduction of the split and washed beans into the interior of the vessel 30 through the upper end 34 having the removable lid 40 thereon. Preferably, the beans are placed in the rotatable pressure vessel 30 along with approximately three to four percent salt by weight (if desired) and a quantity of tap water approximating 63 percent by weight of water to raw bean material. Subsequently, the interior of the vessel 30 is purged of air by the introduction of steam into the lower end 34 of the vessel through the steam introduction means 38 with the steam entering through the hollow axle 36 and steam union 42 as indicated by the arrows in FIG. 3. This purging procedure typically comprises about five to six minutes and after purging, the lid 40 is tightened to allow pressurization of the interior of the vessel by continued introduction of steam therein. The steam introduction is continued until the pressure within the vessel 30 reaches approximately 30 psi absolute (15 psi guage) wherein the beans begin the cooking process. Preferably, the amount of steam or water entered into the interior of the vessel is approximately 20 percent by weight of the raw bean product such that during the washing and cooking step approximately a one to one ratio of water to dry raw beans is utilized. That is, after accounting for the water absorbed during the washing step (approximately 17 percent) and the steam condensate absorbed from the live steam introduced into the vessel to effect the cook (approximately 20 percent) and the tap water added into the interior of the vessel (approximately 63 percent), the total water weight added in the process approximately equals the original weight of the raw beans utilized in the process.

The pressure within the interior vessel 30 is maintained during the cooking process and the vessel 30 is incrementally rotated about its axis 36 at approximately two and one-half minute intervals. In the preferred embodiment, a single revolution of the vessel is accomplished in a seven second period. Thus, during the remaining time in each two and one-half minute interval the vessel 30 is at rest with steam being introduced into the vessel to maintain the steam pressure at approximately 30 psi absolute. After a sufficient cooking time period, i.e. approximately 45 to 90 minutes, the vessel 30 is rotated to an inverted or upside down position from that viewed in FIG. 3 and the steam pressure within the vessel 30 is slowly vented to atmosphere. When all of the pressure within the vessel 30 has been released, the vessel is rotated to its upright position shown in Figure 3, and the lid 40 is opened. The cooked beans are discharged by rotating the vessel 30 to its inverted upside down position. As will be recognized, the periodic incremental rotation of the vessel 30 insures that the beans are gently agitated and that all of the contents of the batch of beans contained within the vessel are contacted by the live steam to insure a uniform cooking procedure. Those skilled in the art will recognize that the frequency of period of rotation of the vessel 30 may be modified. However, too infrequent rotation will result in an uneven cook, while too much rotation will result in a mashing of the cooked portions of the beans, creating a large lump or mass of partially mashed beans, thereby defeating the purpose of rotating the vessel to achieve an even cook. Further, although the apparatus and process utilized in this cooking step has been described in relation to a batch process, those skilled in the art will recognize that the same can be accomplished on a continuous cooking process and apparatus.

Subsequent to the cooking step, the beans may be partially dried as in the first embodiment and are conveyed to a roller mill wherein they are squeezed or pressed into a desired thickness ranging from approximately 0.005 inches to 0.200 inches. As in the first embodiment of the invention, this pressing procedure is extremely important in the process to derive a resultant dehydrated product which is instantly reconstitutable and closely assimilates the organoleptic characteristics of a product freshly made from beans in their natural condition. More particularly, the pressing step insures that the internal cotyledon portion of the bean intricately fractures to a mealy structure upon gentle pressing. This phenomenon is analogous to the pressing of a fully baked potato, wherein the potato fractures into a mealy substance upon squeezing. Since no starch and protein laden effluent is present (as in other prior art processes) during the pressing procedure, the voids created by the intricate fracturing of the bean remain open and unclogged, which substantially decreases subsequent drying time necessary to dehydrate the resultant bean product and additionally affords instant rehydration at time of use. Further, since the pressing procedure does not finely grind or comminute the bean, the texture, color and flavor of the rehydrated bean product are substantially identical to conventionally prepared non-dehydrated refried bean products.

Subsequent to the pressing step, the pressed beans are dried to reduce the residual moisture content to approximately eight to ten percent weight of water to bean products. Preferably, this drying procedure is accomplished by spreading the beans onto a perforated continuous belt dryer conveyor which is maintained at an elevated temperature. A preferable type continuous conveyor dryer is that manufactured by Proctor and Swartz wherein hot air is forced through the continuous conveyor from initially an upward direction and subsequently a downward direction to insure a desired dry of bean product on the conveyor. However, other drying methods can be substituted such as infrared radiation drying and/or microwave radiation drying techniques. Following the drying procedure, lard or vegetable fat may be added to the processed beans prior to packaging or alternatively, at a time just subsequent to cooking of the beans while the beans remain in the pressure vessel, or at a time just subsequent to the pressing step. As in the first embodiment, the resultant dehydrated bean product may then be packaged and subsequently be rapidly reconstituted with water when desired.

Although the presently preferred embodiments of the present invention have been described specifically herein, those skilled in the art will recognize that various modifications may be made to the same without departing from the spirit of the invention and such modifications are clearly contemplated herein.

What is claimed is:

1. A process for producing an instantly reconstitutable leguminous commestible to form a reconstituted food product having the characteristic flavor, texture, and color of conventionally prepared leguminous commestibles comprising the steps:
   cooking a leguminous commestible in a rotating pressure vessel having a predetermined amount of water for a period of time and at a temperature and pressure sufficient to render the leguminous commestible soft and palatable yet leaving the structural integrity of the leguminous commestible largely in tact;
   removing any excess water from said cooked leguminous commestible;
   non-comminutively pressing said leguminous commestible to possess a thickness between 0.005 to 0.200 inches; and
   dehydrating said pressed leguminous commestible to a moisture content of approximately seven to ten percent to form a reconstitutable leguminous commestible, said reconstitutable leguminous commestible being instantly reconstitutable with water to form a product containing particulate matter and having the flavor, texture, and color characteristics substantially simulative of conventionally prepared leguminous commestible.

2. The method of claim 1 wherein the cooking step comprises pressure-cooking the leguminous commestible at a pressure of 0.5 to 25 pounds per square inch for a period of 5 to 90 minutes.

3. The method of claim 1 wherein the water removing step comprises:
   draining the excess water from the leguminous commestible; and
   drying the outside skin of the leguminous commestible.

4. The method of claim 3 wherein the draining step comprises the shaking of the water from the leguminous commestible.

5. The method of claim 3 wherein the dehydrating step thereof comprises blast drying the bean for approximately five minutes at 100 degrees Farenheit.

6. The method of claim 5 wherein the dehydrating step comprises tempering the leguminous commestible to drive exterior moisture remaining on the leguminous commestible into the interior said leguminous commestible.

7. The method of claim 1 wherein the non-comminutive pressing step comprises pressing the leguminous commestible through a pair of rollers.

8. The method of claim 7 wherein the pressing step leaves the leguminous commestible having a thickness between 0.010 inches to 0.050 inches.

9. The method of claim 1 wherein the dehydrating step comprises forcing hot air through the pressed leguminous commestible.

10. The method of claim 9 wherein the leguminous commestible is pinto beans.

11. The method of claim 9 wherein the leguminous commestible is garbonzo beans.

12. The method of claim 9 wherein the leguminous commestible is peas.

13. The method of claim 1 further comprising the step of placing flavor additives into the leguminous commestibles prior to said dehydrating step.

14. The method of claim 13 wherein the flavor additives comprise spices, preservatives and anti-oxidants.

15. A process for producing an instantly reconstitutable leguminous commestible comprising the steps of:
cleaning a quantity of raw leguminosae;
washing said leguminosae in a quantity of water;
coarsely splitting said leguminosae;
cooking said leguminosae in a rotating pressure vessel by introducing steam therein and exhausting air and vapors therefrom as required to maintain a predetermined pressure level within said vessel, said vessel being periodically, incrimentally rotated about at least one axis at a rate sufficient to achieve even cooking of said leguminosae contained therein;
removing any excess water from said leguminosae; and,
non-comminutively pressing said leguminosae into a thin configuration having a thickness of approximately 0.005 to 0.200 inches;
dehydrating said leguminosae to a moisture content of approximately seven to ten percent.

16. The process of claim 15 wherein said cooking step comprises the step of exposing said leguminosae to steam pressure of approximately 30 pounds per square inch.

17. The process of claim 16 wherein said cooking step additionally comprises the step of incrementally rotating said vessel about a horizontal axis.

18. The process of claim 17 wherein said washing step comprises soaking said leguminosae in a quantity of water such that said leguminosae absorbs approximately 17 percent of its raw weight in water.

19. The process of claim 18 wherein said cooking step comprises adding water into said pressure vessel in an amount approximately 63 percent of the weight of said raw leguminosae.

20. The process of claim 19 wherein said cooking step comprises adding steam condensate into said vessel in the amount of approximately twenty percent of the raw weight of said leguminosae.

21. The process of claim 20 wherein said pressing step comprises pressing said leguminosae into a thin configuration having a thickness between 0.010 to 0.050 inches.

22. The process of claim 21 wherein said dehydration step comprises disposing said leguminosae on a continuous conveyor dryer.

23. The process of claim 21 wherein said dehydration step comprises exposing said leguminosae to infrared radiation.

24. The process of claim 21 wherein said dehydration step comprises disposing said leguminosae to microwave radiation.

* * * * *